United States Patent [19]

Duroyon

[11] 4,437,209
[45] Mar. 20, 1984

[54] STUFFING METHOD

[75] Inventor: Herve Duroyon, Beauvais, France

[73] Assignee: Union Carbide Corporation, Danbury, Conn.

[21] Appl. No.: 321,664

[22] Filed: Nov. 16, 1981

[51] Int. Cl.³ .............................................. A22C 11/00
[52] U.S. Cl. ........................................... 17/49; 17/33
[58] Field of Search ................... 17/33, 34, 41, 42, 49, 17/35

[56] References Cited

U.S. PATENT DOCUMENTS

| Re. 30,390 | 9/1980 | Kupcikevicius et al. | 17/35 X |
|---|---|---|---|
| 3,748,690 | 7/1973 | Niedecker | 17/33 |
| 3,872,543 | 3/1975 | Niedecker | 17/33 |
| 4,007,761 | 2/1977 | Beckman | 17/33 X |
| 4,164,057 | 8/1979 | Frey et al. | 17/49 |
| 4,202,075 | 5/1980 | Michel et al. | 17/41 |
| 4,257,146 | 3/1981 | Karp | 17/49 |

*Primary Examiner*—Willie G. Abercrombie
*Attorney, Agent, or Firm*—Dale Lynn Carlson

[57] ABSTRACT

A method of stuffing food product into controllably premoisturized shirred casing using a stuffing machine designed for use with more pliable, fully soaked casing. An internal sizing ring is used to prestretch the premoisturized casing to about its recommended stuffed circumference which significantly reduces stuffing pressure while still achieving the desired stuffed size. The magnitude of the holdback force, and thereby the stuffing pressure, is adjusted by setting the distance between the sizing ring which stretches the casing and a sealing ring which prevents back flow of meat emulsion onto the stuffing horn. After an encased product length is stuffed, and before the gathering and stripping operations associated with the clipping cycle, the sealing ring is advanced away from the sizing ring which serves not only to assist in the advance of additional casing for the gathering operation, but also to reduce the holdback force produced by the sizing ring so that additional casing is more easily drawn from the supply to reduce product pressure buildup during gathering, separating and clipping.

6 Claims, 17 Drawing Figures

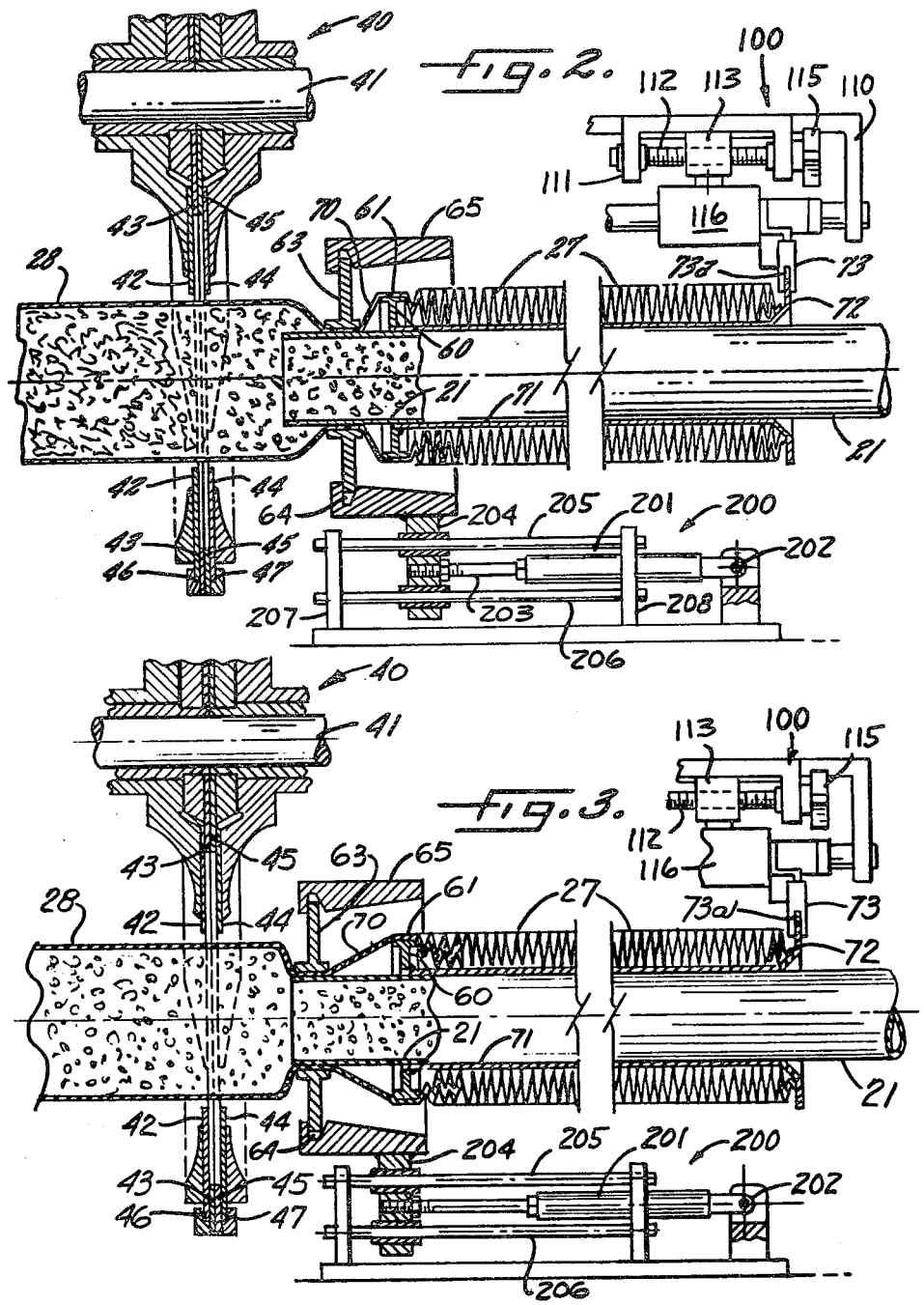

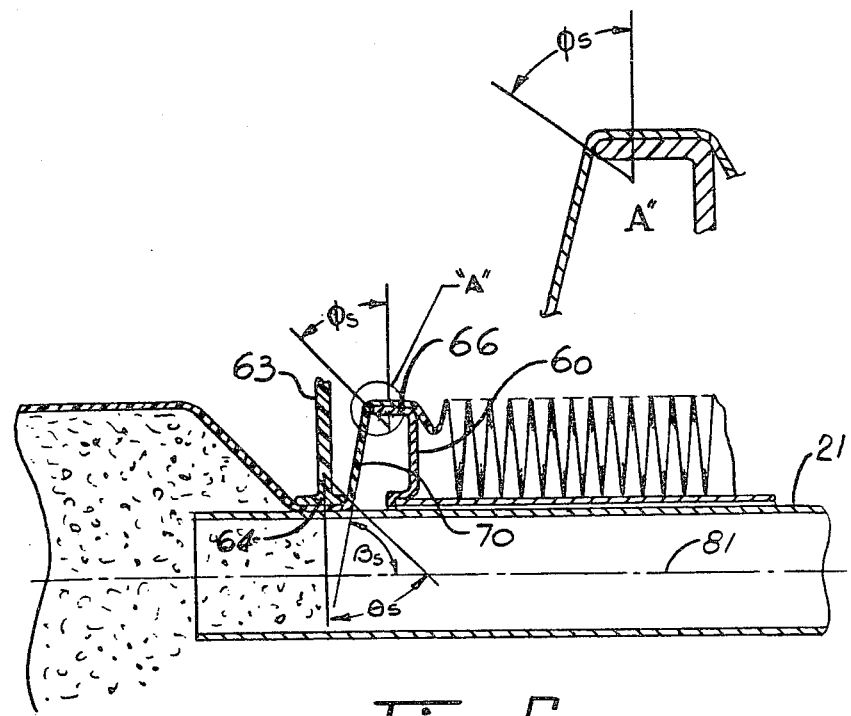
Fig. 6
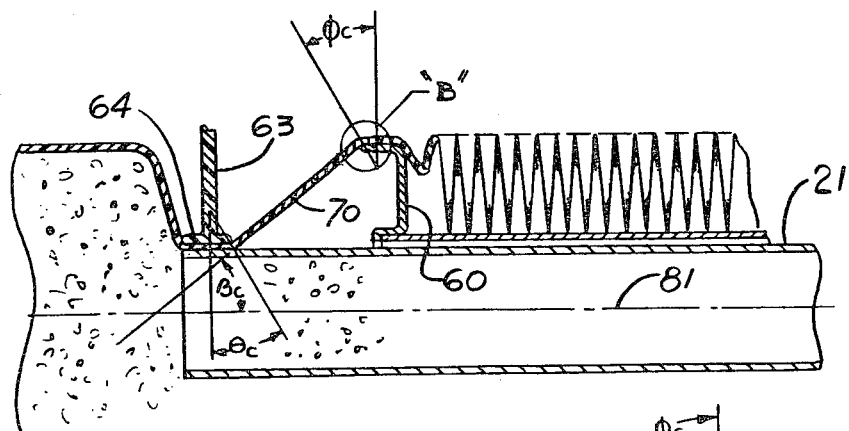
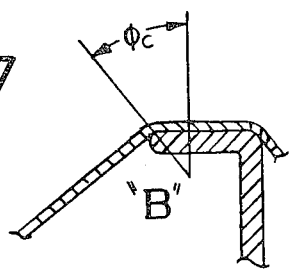
Fig. 7

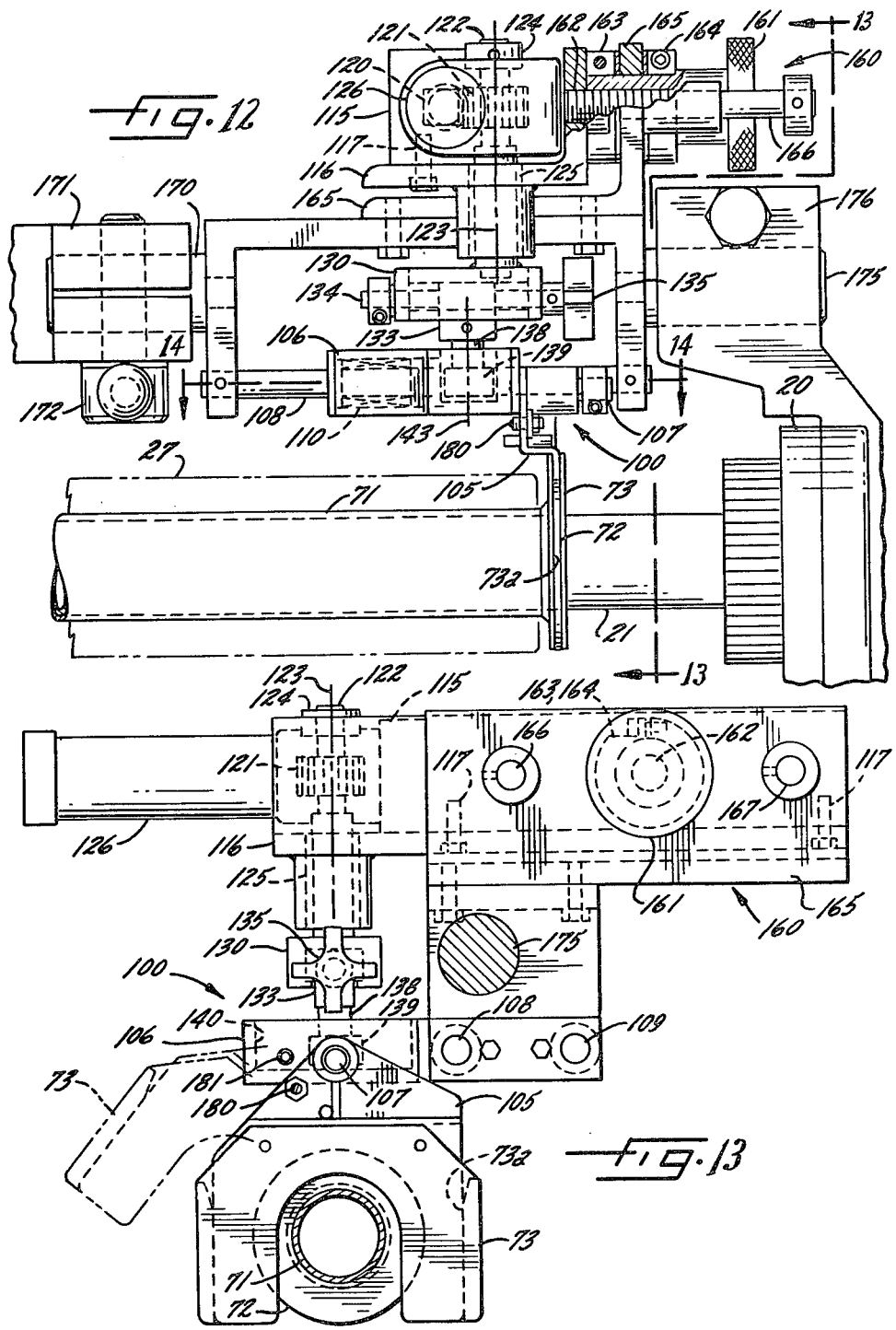

STUFFING METHOD

FIELD OF THE INVENTION

This invention relates to stuffing of food product into shirred casing, and more particularly to a method for utilizing controllably premoisturized casing which avoids the need for soaking just prior to stuffing.

BACKGROUND OF THE INVENTION

Stuffing machines are known which automatically stuff food product, such as emulsion, into a casing length deshirred from a shirred supply, gather the end after the product is stuffed, apply a second tie clip, apply a first tie clip for a subsequent product, and then sever the product from the casing supply.

One such stuffing apparatus which has generally been well accepted, and which is capable of precisely controlling the stuffed diameter of the product is described and claimed in Kupcikevicius et al U.S. Pat. No. Re. 30,390. In that apparatus, a sizing disc or ring is used to stretch the casing to about its recommended stuffed diameter just prior to filling the casing with emulsion. After the desired casing length is stuffed, a gathering and clipping operation is performed immediately adjacent the discharge end of the stuffing horn. A set of gathering gates constricts the casing following which a second tie clip is applied. In order to facilitate the gathering operation without causing an undesirable increase in stuffing pressure, a tension sleeve on the stuffing horn is reciprocated fore and aft to create a predetermined length of slack casing which can be drawn upon as the gathering gates constrict the sausage end. Because the gathering and second tie clipping is performed immediately adjacent the discharge end of the stuffing horn, the application of the first tie clip to the end of the casing supply must be performed in a later part of the cycle, after the clipper head is indexed to bring the first tie clipper into play. Such a sequential clipping cycle tends to extend the cycle length. This is not a serious drawback in the production of relatively large slicing size sausages, where careful application of the second tie clip is important, because a significant portion of the overall cycle is used in the actual stuffing operation. However, as the sausages become shorter in length and smaller in circumference, the clipping cycle becomes a more significant proportion of the overall stuffing cycle.

The casing which is commercially used in this stuffing system (U.S. Pat. No. Re. 30,390) is controllably premoisturized by the casing manufacturer and provides several advantages. First of all, there is no need to soak the casing stick at the processing plant immediately prior to stuffing. This yields a significant advantage with respect to convenience, in that the time, equipment, and effort heretofore used in soaking the casing prior to stuffing is eliminated. Furthermore, with the moisture content of the casing being at a controlled level, the casing tends to behave in a predictable fashion on the stuffing machine. Finally, because soaking just prior to stuffing is not a requirement, the casing can be shirred to higher pack ratios, so that a greater length of casing can be shirred into a stick of predetermined length, thereby reducing stuffing machine down time due to stick loading.

A second type of automatic stuffing machine, popular for at least some applications such as chubbing, is known as the Polyclip FCA-S (Model 3451), and aspects thereof are generally described in Niedecker U.S. Pat. Nos. 3,748,690 and 3,872,543. The cycle time for the clipping cycle in this chubbing machine is reduced by applying the second tie clip to the stuffed product and the first tie clip to the casing end simultaneously. However, such simultaneous operation prevents the clipping mechanism from gathering the encased product immediately adjacent the stuffing horn. In practice, a pair of closely spaced gathering gates contact the stuffed product at about its fully stuffed circumference to gather the casing, then separate laterally to provide room for applying a pair of clips. During the course of constricting and lateral separation, some of the stuffed emulsion must be displaced. The machine achieves casing holdback with an external snubbing device which can be advanced to effectively release the holdback so that casing can be drawn from the thus-released supply to accommodate the displaced emulsion.

As a result of using external holdback, however, the only mechanism available for stretching the casing to size is the meat mass entering the casing. This has been found acceptable for fully soaked casing, because such casing is relatively pliable and can thus be stretched to size by the meat mass. It has been found, however, that when using this approach with controllably premoisturized casing which is much less pliable, stuffing pressure is raised to levels which often cause the casing to break or the first tie clip to fail.

More particularly, casing which is controllably premoisturized to a commercially acceptable level (for example about 20 wt. %) is much less pliable than fully soaked casing. As a result, stuffing pressures with premoisturized casing can be higher on the FCA-S chubbing machine than those encountered with fully soaked casing by a factor of 2 or 3. This substantially increased stuffing pressure magnifies any problems with retention of clips on the product, problems which are particularly acute when stuffing short chubs.

In order to stuff controllably premoisturized casing on such a chubbing machine, while at the same time limiting stuffing pressures to levels which will not cause the casing or clip to fail, it has been found most advantageous to use a sizing ring as described in Beckman U.S. Pat. No. 4,007,761, incorporated herein by reference. The sizing ring circumference is selected to stretch the casing to about its recommended stuffed diameter so that emulsion entering the casing need only fill the casing while causing little, if any, additional stretching.

Unfortunately, disposing a sizing ring within the casing to stretch the casing to size on the chubbing machine creates additional problems since the sizing ring establishes an additional holdback force which is excessive when combined with the holdback force of the previously discussed FCA-S snubbing device.

In the machine described in the afore-mentioned U.S. Pat. No. Re. 30,390, a slacking arrangement is provided in which a reciprocating pneumatic cylinder cycles a tension sleeve fore and aft to create a controlled length of slack casing which, in effect, substantially reduces the holdback force for that slack length. The slack casing is available to be drawn by the gathering gates in the gathering and clipping operation. The cycle time attributed to the gathering and second tie clip application in the U.S. Pat. No. Re. 30,390 apparatus is on the order of 1 or 2 seconds, allowing the use of double-acting pneumatic cylinder to reciprocate the tension sleeve. A direct application of this slacking approach to the simultaneous double clipper of the FCA-S chubbing machine would require an unacceptable extension of the clipping cycle time.

Use of the U.S. Pat. No. 4,007,761 sizing ring concept involves passing the casing over the sizing ring and through a sealing ring (which prevents emulsion back flow) whereupon it is filled with food product from the stuffing horn. In order to adjust the stuffing pressure to achieve a desired product size, the distance between the sizing ring and sealing ring is adjustable to vary the casing angle between the two rings to produce a specific holdback force of a magnitude sufficient to cause the casing to fill to the desired size.

When the desired amount of product is stuffed into the casing, the food pump is de-energized and the relationship between the sizing and sealing rings continues to oppose the pressure within the product which was created by the original holdback force. If gathering and clipping were attempted in that condition, an unacceptable product pressure buildup would occur.

SUMMARY OF THE INVENTION

In accordance with the present invention, we have found that sufficient pressure reduction can be achieved, and additional casing advanced by translating the sealing ring away from the sizing ring as gathering commences. This action provides a number of benefits.

First of all, although there is no significant gripping of the casing by the sealing ring, because of the pressure within the product and the enlarged size of the product adjacent the sealing ring, the sealing ring tends to carry the product and an additional amount of casing toward the end of the horn, creating a localized pressure reduction.

More importantly, by increasing the distance between the sealing ring and sizing ring, the angle of the tensioned casing segment between the rings is reduced, thereby reducing the holdback force. As a result, the forces generated during the gathering and separating phases of clipper operation first of all tend to be accommodated by the previously created localized pressure reduction. More importantly, however, since the holdback force is reduced due to a reduction in frictional forces on the casing brought about by the altered relationship of the sizing ring and the sealing ring (e.g. the increased distance between said rings,), any additional casing required during gathering and clipping is available from the supply of shirred casing. Thus, there is not a tendency to increase product pressure beyond acceptable limits, since the casing holdback force has been decreased due to the reduced casing frictional forces as evidenced by reduced casing angle achieved by advancing the sealing ring.

An apt discussion of the theory behind this method of avoidance of pressure buildup beyond acceptable limits is found in U.S. Pat. No. 4,164,057 (particularly at column 3, lines 18-49) and U.S. Pat. No. Re. 30,390, both incorporated herein by reference.

We have also found that, through the use of an improved version of the slacking arrangement described hereinabove, (i.e. faster actuation time) in conjunction with the sizing ring and the translatable sealing ring, further advantageous reductions in emulsion pressure can be achieved.

OBJECTS OF THE INVENTION

In view of the foregoing, it is a general aim of the present invention to facilitate use of controllably pre-moisturized shirred casing on machines which operate like the aforementioned chubbing machine.

In accomplishing that aim, it is an object of the invention to effectively utilize a sizing ring to prestretch such casing before stuffing so as to reduce the required stuffing pressure when employed together with a translatable sealing ring.

To further accomplish that aim, it is an object of the invention to add a slacking means, preferrably a fast-acting slacking means, for optional coaction with the sizing ring and translatable sealing ring which will controllably create a desired amount of additional slack casing without substantially extending the clipping cycle time.

An additional object is to accomplish the gathering and clipping operations without any significant increase in pressure within the stuffed product.

Other objects and advantages will become apparent upon reference to the following detailed description of the invention.

DETAILED DESCRIPTION OF THE INVENTION

FIGS. 2–5 are fragmentary sectional views illustrating the constricting and separating operations of the gathering gates for the embodiment shown in FIG. 1;

FIGS. 6 and 7 illustrate in detail the coaction of the sealing ring and sizing ring to produce the casing holdback force in typical machine stuffing and gathering/clipping positions, respectively;

FIG. 12 is a plan view of the slacking mechanism taken along the line 12—12 of FIG. 8;

FIG. 13 is an elevational view of the slacking mechanism taken along the line 13—13 of FIG. 12;

While the invention will be described in connection with preferred embodiments, there is no intent to limit it to those embodiments. On the contrary, the intent is to cover all alternatives, modifications and equivalents properly included within the spirit and scope of the invention as defined by the appended claims.

Figure 1:
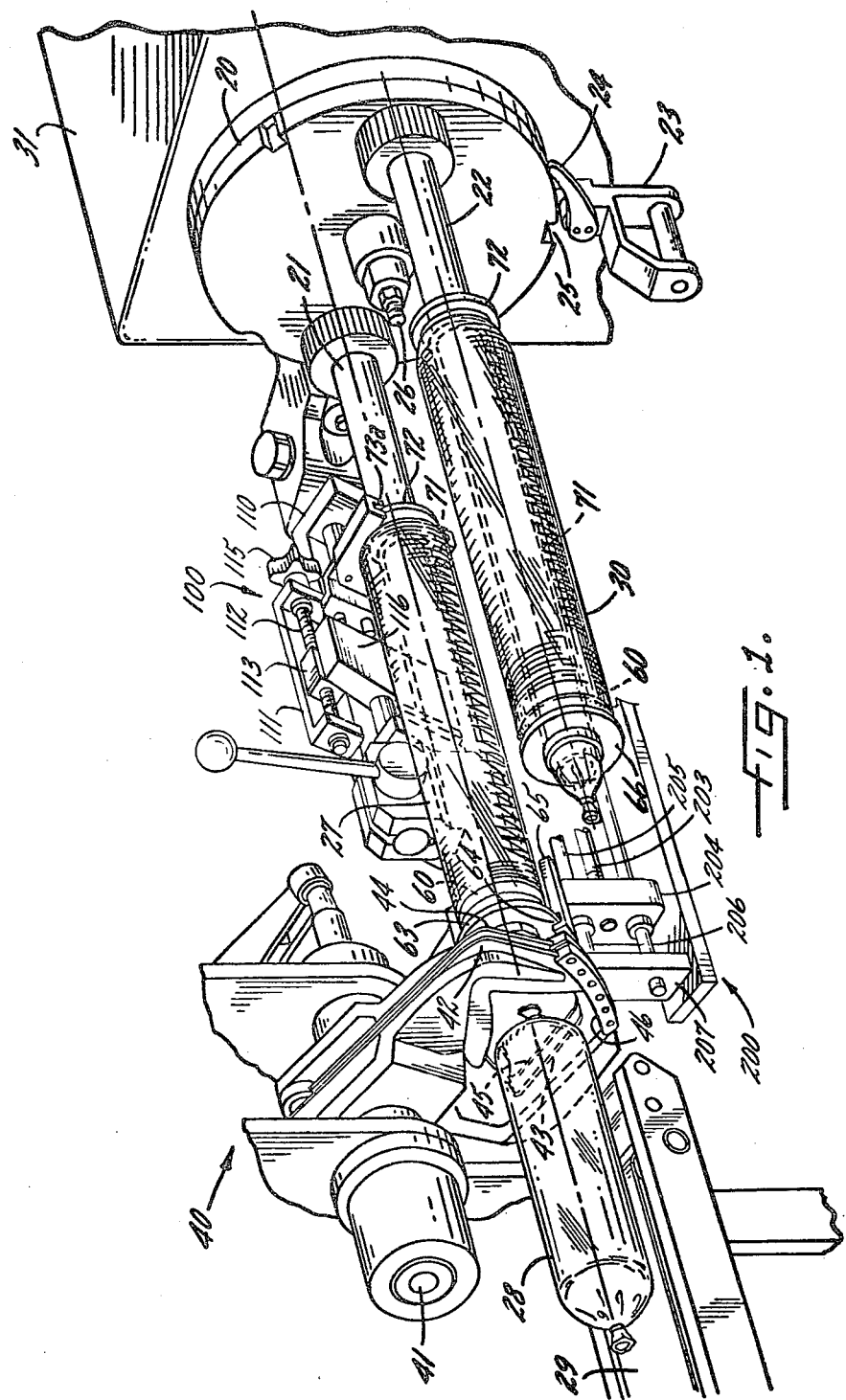
FIG. 1 is a perspective view of a portion of a chub stuffing machine modified in accordance with an embodiment of the present invention.

Turning now to the drawings, FIG. 1 shows a portion of the aforementioned FCA-S stuffing machine, in conjunction with which the method of the present invention can be practiced. As conventionally supplied, the stuffing machine includes a turret 20 having a pair of stuffing horns 21, 22 mounted thereon. Indexing means 23 are provided having a tang 24 for engaging notches in the turret, such as notch 25, for indexing the turret about a mounting post 26. In the illustrated condition, the stuffing horn 21 is in the operating position in which the casing supply 27 mounted thereon is ready to be stuffed with food product from a food pump schematically illustrated at 31 to produce stuffed and clipped sausages 28 which are carried away on a conveyor 29.

A second casing supply 30 is mounted on the horn 22 and is ready to be indexed into the operative position after the casing supply 27 is expended.

Also as commercially supplied, the stuffing machine includes a gathering and clipping mechanism, a portion of which is illustrated at 40. The actual clipper has not been shown in order to avoid obscuring the invention. In practice, however, the clipping device does operate in conventional fashion to apply a second tie clip to the trailing end to close the encased stuffed product, and a first tie clip to close the casing to form the leading end of a subsequent product, following which a knife is actuated to sever the encased product from the clip closed casing supply.

Referring in greater detail to the gathering mechanism 40, it is seen that two pair of cooperating generally V-shaped gripper jaws (sometimes known as spreader bars) are provided for pivoting about a common shaft 41. The second tie gripper, (the gripper closest to the stuffed product) includes an upper jaw 42 and a lower jaw 43, and the first tie gripper (the gripper nearest the casing stick) includes an upper jaw 44 and a lower jaw 45. In order to keep the paired jaws in alignment, each of the lower jaws provides a channel 46, 47 in which the upper jaw rides as the grippers pivot toward and away from each other.

FIG. 1 illustrates the normal operating position of the gripper in which the jaws are open, creating a substantial opening 48 through which a stuffed product can pass. When it is desired to gather and clip a product, the jaws are pivoted about shaft 41 by motive means (not shown) to assume the position illustrated in FIG. 4. It is seen that a very restricted opening 49 is created so that the casing within that opening is gathered and tightly gripped.

Figure 5:
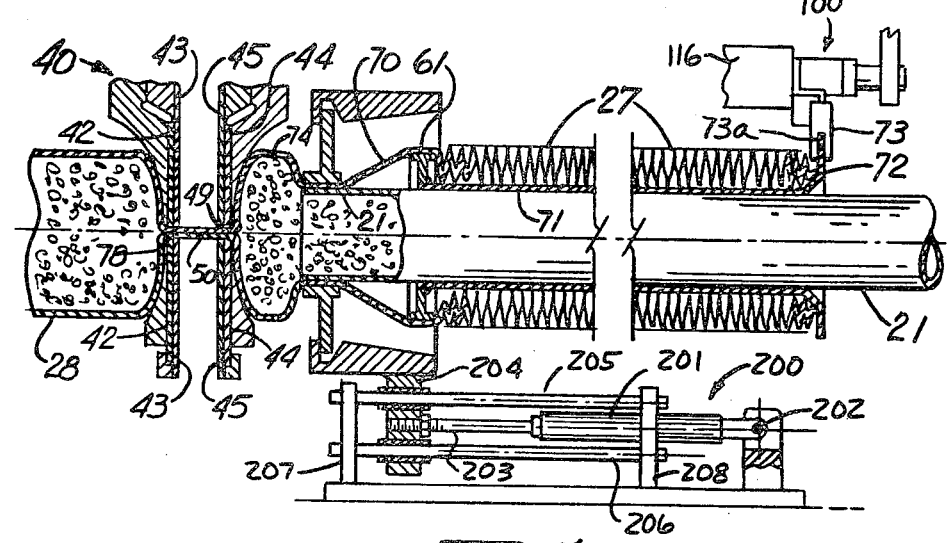
Figure 8:
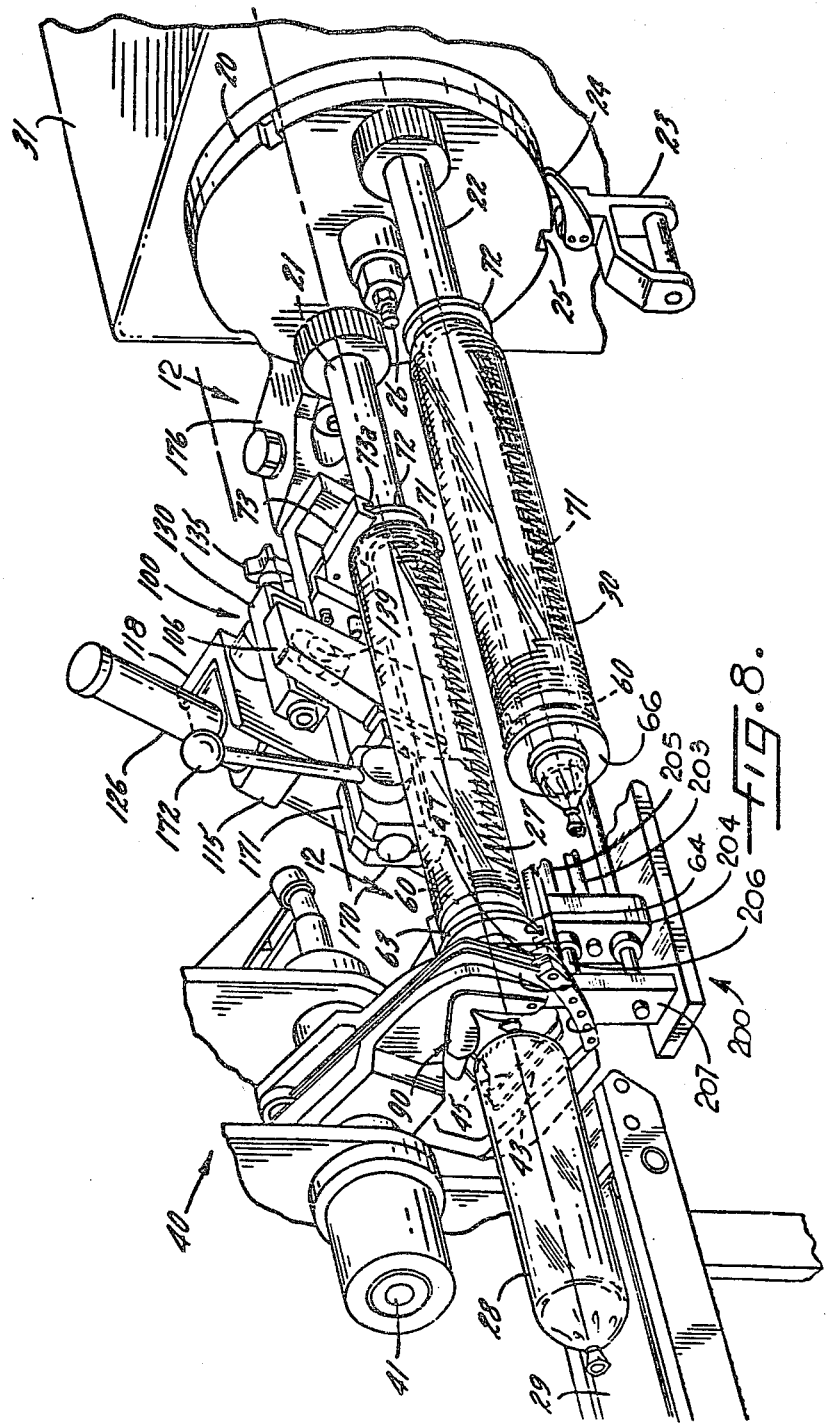
FIG. 8 is an alternate embodiment of the invention wherein a fast-acting slacking arrangement has been added.
Figure 9:
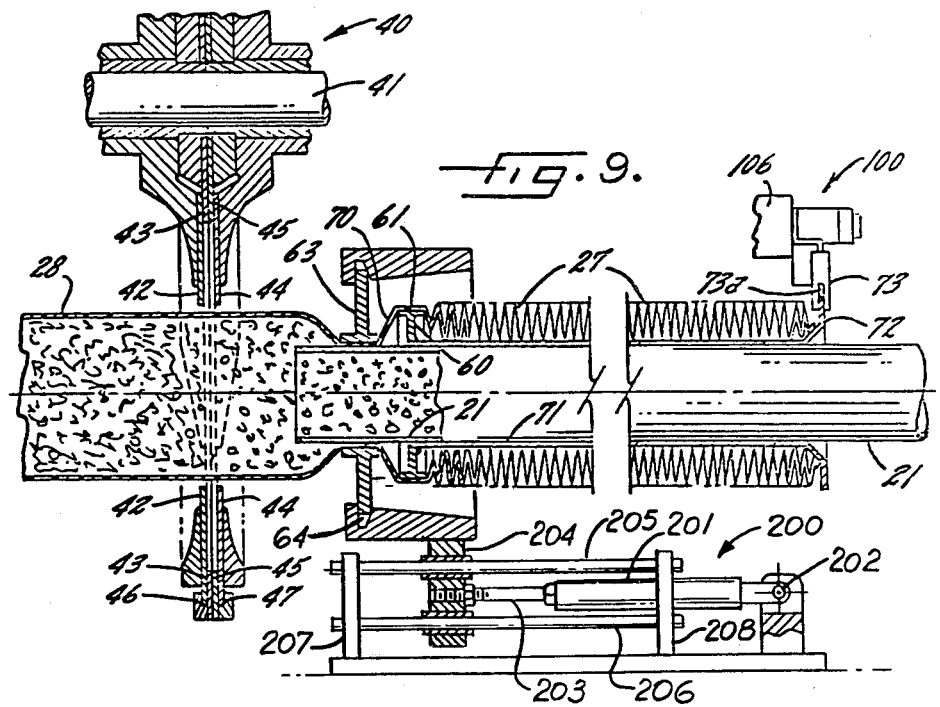
FIGS. 9–11 are fragmentary sectional views illustrating the constricting and separating operations for the alternate embodiment shown in FIG. 8.

In order to create a casing tail and sufficient room to apply a pair of clips, in addition to the constricting action of the gripper, the gripper jaws 42, 43 are adapted to move axially away from the jaws 44, 45 to assume the FIG. 5 position. The jaws grip the casing sufficiently tightly so that the meat emulsion is displaced from the casing segment 50. As is conventional, after the system assumes the FIG. 5 position, a pair of clippers apply a second tie clip to the stuffed product and a first tie clip in preparation for stuffing a succeeding product, following which a knife severs the casing between clips to separate the product. The gripper then returns to the FIG. 1 position so that a subsequent product can be stuffed out.

As commercially supplied, the chub stuffing machine includes an external holdback device such as shown, for example, in the aforementioned Niedecker patents, which serves to create a holdback force by circumferentially gripping the casing near the discharge end of the stuffing horn. As is well known by those skilled in this art, the gripping force of the external holdback means can be increased or decreased to increase or decrease, respectively, the stuffing pressure. In practice, a particular holdback force is achieved which tends to produce a pressure which stuffs the product to the desired circumference. In prior commercial applications of this chub stuffing machine, fully soaked casing is used which is comparatively pliable. The external holdback device is adjusted to create sufficient pressure so that the meat mass entering the casing stretches the casing to about its desired stuffed circumference. In some cases, the machine can be operated to understuff the encased product and thereafter increase the product pressure during the gathering and separating phase of the clipping cycle. In other cases, as described in the Niedecker U.S. Pat. No. 3,748,690, since the primary holdback device is the external snubber, it is a relatively simple matter to translate the snubber as a means of releasing additional casing or reducing the holdback force in order to provide additional casing to be used during the gathering and separating phase of the clipping cycle.

It has been found that using an external holdback device is unsuitable for controllably premoisturized casing (say at about 20 wt. % moisture level) because the stuffing pressures required to cause the meat mass to stretch the casing to its intended stuffed circumference are so great that the pressure tends to blow the first tie clip from the casing end rather than deshirr the casing and stuff the product. Alternatively, stuffing pressure can be reduced, but at the expense of understuffing the product.

It has been found that it is possible to operate the chub stuffing machine in such a way, to be described in detail below, so as to make it completely compatible with controllably premoisturized casing, without the danger of rupturing the casing or blowing off clips. First of all, in order to reduce stuffing pressure to manageable levels while still stuffing the product to the desired size, means are provided for prestretching the casing to about its recommended stuffed circumference prior to stuffing. To that end, each of the premoisturized casing supplies 27, 30 of FIG. 1 is provided with a sizing means 60 having a circumference very near the desired stuffed circumference of the product, such that the casing, as it deshirrs and passes over the ring, is stretched to about the desired size. It is believed that the casing in so passing over the ring is stretched so as to take at least a temporary set, which reduces stuffing pressure. As a result, the meat entering the casing needs to provide little additional casing stretching. Thus, stuffing pressure can be reduced to a level adequate to pull the casing over the sizing ring 60, and the casing can be filled while in its temporary set condition to the desired stuffed size without the need for excessive stuffing pressure.

Referring more particularly to FIG. 2, there is shown the sizing ring 60 and a deshirred portion 61 of the casing passing thereover and being stretched to about the size of the encased product 28. The primary holdback device is the sizing ring 60 and, since the ring is fixed in size, that factor is not available as a variable in reducing the holdback force. It has been known to reciprocate the sizing ring 60 in order to create a slack length of casing for accommodating the clipping cycle, as shown, for example, in the aforementioned Kupcikevicius U.S. Pat. No. Re. 30,390. However, reciprocation of the sizing ring, along with the attached casing supply, can take an undesirable amount of time, particularly when stuffing small chubs.

As shown in FIG. 2, cooperating with the sizing ring 60 is a sealing ring 63 carried in a holder 65. A tensioned length of casing 70 interposed between the two rings is at a substantial angle during stuffing as shown in FIG. 2. The distance between the sizing ring 60 and sealing ring 63 is adjusted by a mechanism 100, creating a desired holdback force to produce a product of the desired stuffed size. It is seen in FIGS. 1 and 2 that the adjustment mechanism is mounted on a fixed bracket 110 and includes a block 111 carrying a lead screw 112 engaged with a translatable nut 113. The nut 113 is affixed to a bracket 116 which in turn is affixed to the holder 73 which is slotted at 73a to engage the flange 72 of the plastic tube 71 which carries the casing supply 27 and sizing ring 60. As a result, adjustment of the position control knob 115 serves to establish a particular distance between the sizing ring 60 and sealing ring 63. Adjustment of the holdback force in this way sets the angle of the casing segment 70 disposed between the two rings and thus establishes the force component on the casing which is parallel to the horn axis. It is this force component which must be overcome by the stuffing process.

In practicing the invention, means are provided for assisting in translating the casing along the stuffing horn to avoid excessive pressure in the stuffed casing, while at the same time reducing the angle of the casing segment 70 so that the force component required to pull additional casing 61 over the sizing ring 60 is reduced. Since the stuffed product is at the desired diameter as determined by the magnitude of the holdback forces with the elements in the FIG. 4 position, reducing the holdback force serves to insure that any additional casing which is required for separating the jaws as shown in FIG. 5 is available from the source 27, rather than by way of increasing product pressure.

As schematically illustrated in the drawings, the holder 65 is provided with means 200 for translation thereof (along with the sealing ring 63 which it carries) axially along the stuffing horn. The means 200 includes a pneumatic cylinder 201 fixed at 202 with respect to the stuffing machine having an operating rod 203 for translating a block 204 along a pair of guides 205, 206 also fixed at 207, 208 with respect to the stuffing machine. The block 204 is attached (see FIG. 2 for example) as by welding to the carrier 65. Thus, actuation of the cylinder 201 causes the block 204 with attached carrier 65 to be translated to the left, carrying the sealing ring 63 to about the end of the stuffing horn. The cylinder 201 is an element of the FCA-S stuffing machine and is adapted by the control circuitry thereof to translate to the left at the very initiation of the clipping cycle, before the gathering gates contact the stuffed product.

Thus, as shown in FIG. 3, after the desired amount of product is stuffed into the casing supply, and the food pump de-energized, the first step in the gathering and clipping operation is the translation of the carrier 65 with attached sealing ring 63 to about the position illustrated in FIG. 3. Although there is no substantial gripping between the inside surface of the ring 63 and the casing which it encircles, because of the pressure within the product 28 and the enlarged size of the product, a portion of the casing supply is translated to the left by movement of the sealing ring. This action is enhanced because, as the ring advances, the angle of the casing segment 70 is decreased, reducing the force required to pull additional casing over the sizing ring 60 from the supply 27.

Figure 4:
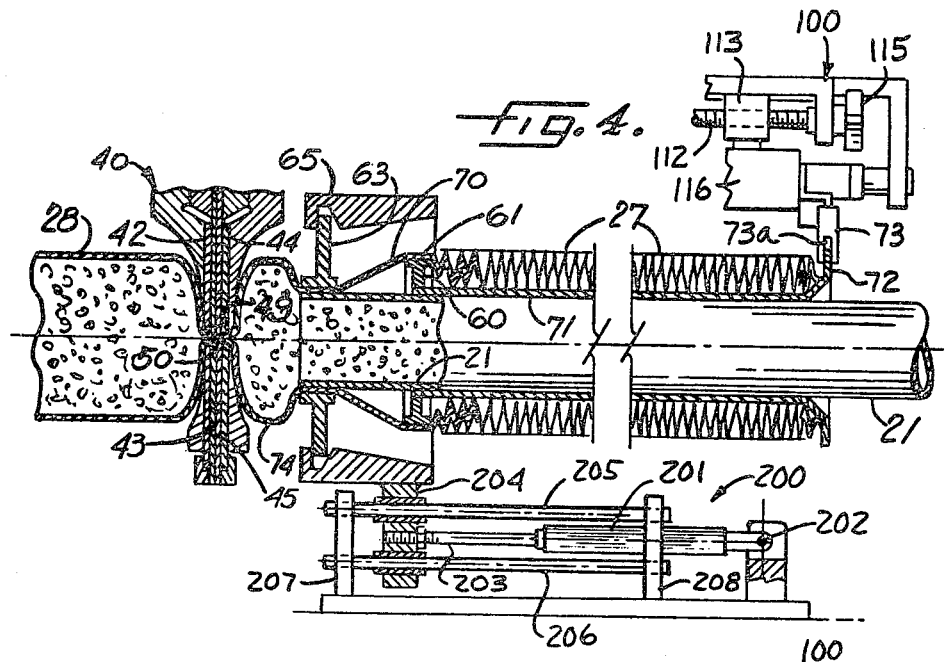

As a result of the translation of the casing, with no additional product discharged from the stuffing horn while the casing is translated, there is a pressure reduction in the product. This pressure reduction is useful in accommodating at least a part of the displaced emulsion caused by the constricting of the product 28 by activation of the gathering mechanism. As shown in FIG. 4, after the carrier 65 with sealing ring 63 has advanced to the leftmost position, the opposed gathering gates 42, 43 and 44, 45 are closed to constrict the product as shown at 49. The emulsion displaced during the gathering operation is first accommodated by the pressure reduction just described. In addition, because of the relatively shallow angle of the tensioned casing segment 70 between the sealing ring 63 and the sizing ring 60, much less force is required to draw additional casing over the ring and from the supply 27, certainly less force than had been required to stuff the casing. As a result, any additional casing required during the constricting phase shown in FIG. 4 is available to be drawn from the supply, which prevents a detrimental increase in product pressure beyond that initially achieved.

FIG. 5 shows the separating phase of the stripper mechanism operation in which the pair of gates 42, 43 are translated to the left away from the stationary gates 44, 45 to create a casing tail 50. While it may be desirable in some circumstances to cause the gates 42, 43 to grip the product more tightly than the gates 44, 45, assuring that all casing slippage is at the last-mentioned gates, in many cases that is not necessary using the instant procedure. That is so because of the reduced casing angle 70 and the resulting reduced holdback force, which makes the casing supply 27 available to supply any additional casing required during separating, thereby minimizing the pressure buildup within the stuffed product.

After the system assumes the FIG. 5 position, a pair of clips are applied to the casing tail 50, and the casing between the clips is severed to separate the stuffed product 28 from the casing supply. Thereafter, the gates are opened to the FIG. 2 position and the pump is reactivated to stuff another sausage. Stuffing is initiated just prior to moving the carrier 65 with the sealing ring 63 to the normal "stuff" position of FIG. 2. This sequencing of events provides a low holdback force at the start of stuffing to prevent excessive pressure buildup in the casing due to initial emulsion flow.

An alternate sequence of operation would involve moving the carrier 65 with sealing ring 63 to the FIG. 2 position with the gates in the closed position and prior to reactivation of the emulsion pump. This would provide additional casing or "front" slack to accommodate residual emulsion 75 from the previous stuffing cycle entrapped in casing portion 74, thus avoiding, in an alternate manner, undue pressure on the casing or forward clip upon reactivation of the emulsion pump.

FIGS. 6 and 7 illustrate in detail how the relative positions of the sealing ring and the sizing ring affect the holdback force on the casing.

In FIG. 6, nylon sealing ring 63 is in the stuffing position of closest set proximity during a given stuffing cycle to the high-density polyethylene (HDPE) sizing ring 60. The section of casing 70 between said sealing ring and said sizing ring, forming an angle $\beta_s$ with the longitudinal axis 81 of the stuffing horn 21, is in frictional contact with a surface portion $\theta_s$ of the inner rim 64 of the sealing ring 63 and a surface portion $\phi_s$ of the outer rim 66 of the sizing ring 60. The combined casing contact areas denoted by $\theta_s$ and $\phi_s$ are proportional to the frictional forces which when added to the constant casing holdback force component created by the stretching action of the sizing ring, establish the instantaneous total holdback force on the casing.

FIG. 7 shows the sealing ring 63 moved to the gathering and clipping position wherein the distance between said sealing ring and the sizing ring 60 is a set maximum for a given stuffing cycle. The section of casing 70 between said sealing ring and said sizing ring, forming a significantly smaller angle $\beta_c$ with the longitudinal axis 81 of the stuffing horn 21 than when in the stuffing position, is in frictional contact with a surface portion $\theta_c$ of the inner rim 64 of the sealing ring 63 and a surface portion $\phi_c$ of the outer rim of the sizing disc 60. It can be seen that since $\theta_c$ and $\phi_c$ are significantly smaller than $\theta_s$ and $\phi_s$, the casing frictional forces are proportionately less for the gathering and clipping position than for the stuffing position. Since the holdback component produced by the radial casing stretching action of the sizing ring is unchanged between the stuffing and gathering/clipping positions, the total casing holdback force produced by the coaction of the translatable sealing ring and the sizing ring is clearly seen to be significantly less in the gathering and clipping position illustrated in FIG. 7 than in the stuffing position depicted in FIG. 6.

Figure 10:
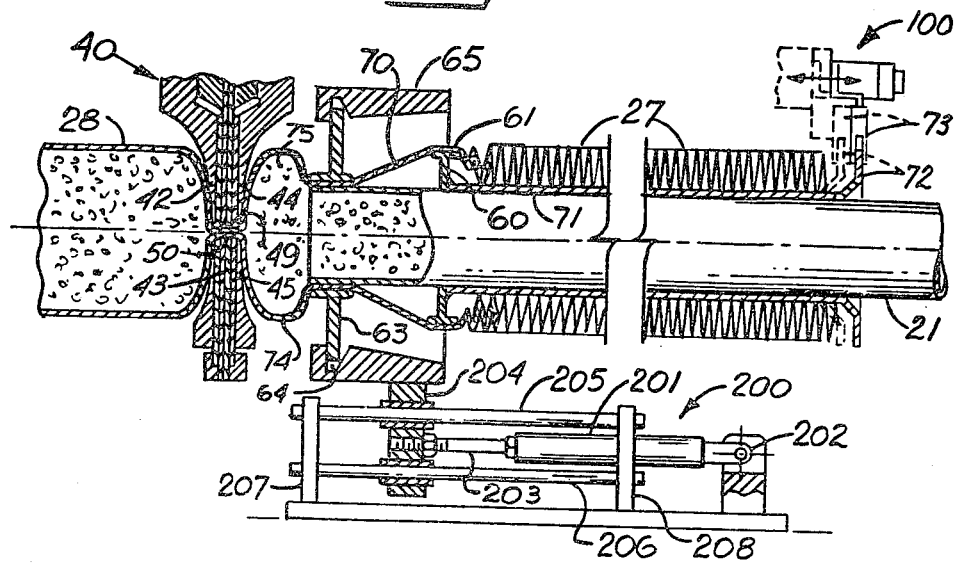
Figure 11:
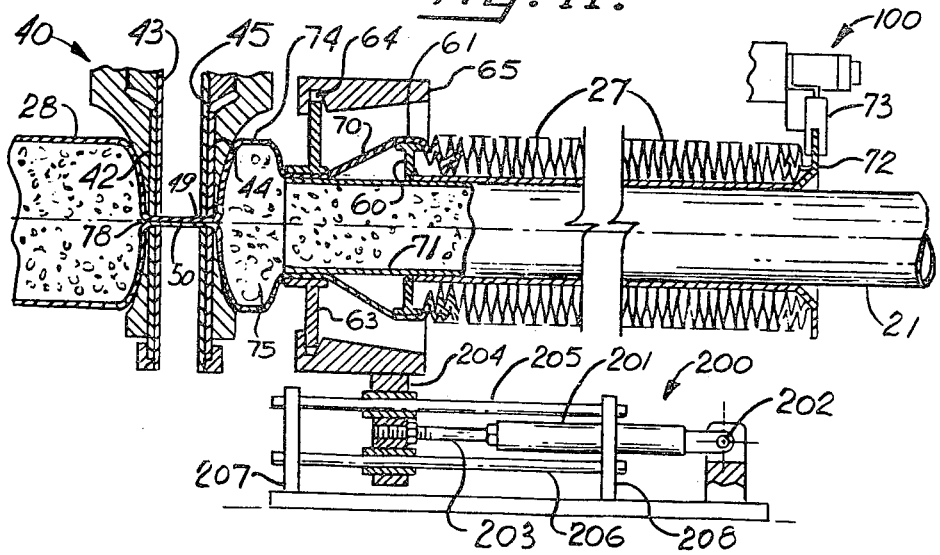

An alternate embodiment of the invention creates additional casing slack, particularly at the time of gathering and constricting (i.e. "rear" slack), providing an even greater range of operation for certain combinations of casing size, emulsion type, clip type, etc. In effect, a fast-acting slacking arrangement is added to the embodiment already described. Such a combination is depicted in FIGS. 8 through 15. It should be noted that the plastic tube 71, which carries the casing supply 27 and the sizing ring 60, also functions as a tension sleeve which is slidably supported on the stuffing horn 21. The tension sleeve 71 is flanged at 72 to be engaged by a holder 73 which can be reciprocated for moving the sleeve aft and then forward on the stuffing horn. FIG. 10 in solid lines shows the aft position of the tension sleeve (with respect to its previous forward position shown in dashed lines) and illustrates that the casing length 70 between the sizing ring 60 and the sealing ring 63 is increased. The sleeve is moved quickly aft and then returned to the forward position as the gathering gates 42, 43, 44, and 45 begin to engage the encased product and constrict it in going from the machine position depicted in FIG. 9 to that shown in FIG. 10. As a result, the increased portion of the casing length 70 between the sizing ring 60 and sealing ring 63 is available to receive product which is displaced by the gathering gates.

While various forms of slacking devices can be used, it is desirable to provide a fast-acting slacking mechanism, preferably one having a slacking cycle of no greater than about 0.16 seconds so that the clipping cycle need not be delayed or lengthened.

Referring again to FIG. 8, it is seen that the shirred casing supplies 27, 30 are not mounted directly on the respective stuffing horns 21, 22, but instead are disposed upon respective tension sleeves 71, which are slideable on the stuffing horns. Referring particularly to the casing supply in the operative position, it is seen that the sleeve 71 has a flange 72 which fits within a channel 73a in its sleeve engaging bracket 73. The bracket 73 in turn is quickly reciprocated by a slacking mechanism generally indicated at 100 in a manner now to be described.

The illustrated chub stuffing machine as commercially supplied has a clipping cycle time of only about 0.7 seconds. The first phase of the cycle is the constricting or gathering operation, and that is completed (to the state shown in FIG. 10) in about 0.16 seconds. To be effective, the slacker must be capable of creating slack before constricting is completed. In order to assure that slack is available, we prefer to delay the initiation of the clipping cycle until slacking is accomplished; in addition, we prefer to accomplish slacking as quickly as possible so that the delay is relatively imperceptible. Using a pneumatic cylinder which must be both advanced and retracted to complete a slacking cycle would not be a practical solution capable of achieving the desired operating speed. However, using the slacker now to be described, the delay can be limited to a relatively insignificant 0.1 seconds.

Figure 14:
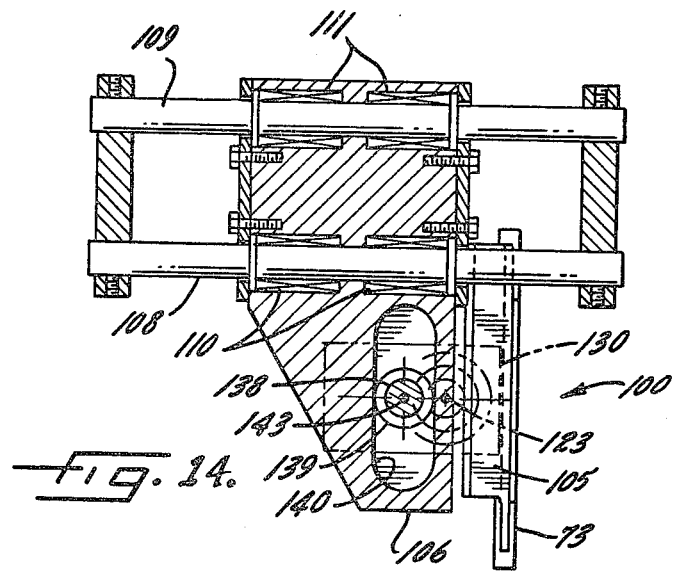
FIG. 14 is a partial sectional view showing the translating elements of the slacker taken along the line 14—14 of FIG. 12.

In practicing this aspect of the invention, a slacker is provided which creates a full reciprocation of the tension sleeve with a single linear throw of the actuating mechanism. As best shown in FIGS. 12-14, the sleeve engaging bracket 73 is mounted on an actuator arm 105 which in turn is affixed to a sliding block 106 mounted for reciprocation on a pair of guide rods 108, 109. The block 106 is fitted with ball bushings 150, 151 which facilitate its travel in a direction parallel to the axis of the stuffing horn.

In keeping with the invention, the sliding block 106 is reciprocated by a linear to rotary to linear actuator in such a way that a full reciprocation is accomplished by a single stroke of the linear actuator. A linear actuator, shown herein as a pneumatic cylinder 115 is secured to a base plate 118 as by bolts 117. Affixed to the operating rod of this cylinder is a gear rack 120 which engages a pinion 121 mounted on a shaft 122 disposed for rotation about an axis 123 in bearings 124, 125. A protective cover 126 provides sufficient clearance for a full advance stroke of the piston within the cylinder 115. The piston stroke and gear ratios are arranged such that a full stroke of the cylinder causes a 360° rotation of the pinion 121.

The shaft 122 is affixed as by welding to a stroke adjusting block 130, such that rotation of the pinion causes the block 130 to rotate about the axis 123 of the shaft 122. A T slot nut 133 is held in a track in the block 130 and engages a stationary lead screw 134 having an adjusting knob 135 secured to one end thereof. Rotation of the knob 135 serves to advance the T slot nut either to the left or to the right as shown in FIG. 12, depending on the direction of rotation.

The T slot nut 133 is affixed to a further shaft 138 which carries a cam follower 139. The cam follower, in turn, is engaged in an elongated slot 140 in the sliding block 106. As best shown in FIG. 14, the slot 140 is perpendicular to the axial direction of travel of the sliding block 106. The shaft 138 with attached cam follower 139 create an axis 143 which, by adjustment of the stroke adjusting screw 135, can be displaced from the axis 123 of rotation of the shaft 122. Accordingly, when the pneumatic cylinder 115 is actuated from either the retarded to the advanced position or from the advanced to the retarded position, the resulting 360° rotation of the shaft 122 by means of pinion 121 causes a corresponding 360° rotation of the complete stroke adjusting block 130 and, by means of the cam follower 139 riding in the slot 140, a reciprocation of the sliding block 106.

Figure 15A:
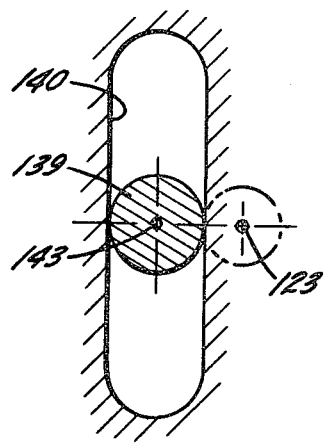
FIGS. 15a–15c are diagrams illustrating the motion of the translating elements of FIG. 14.
Figure 15B:
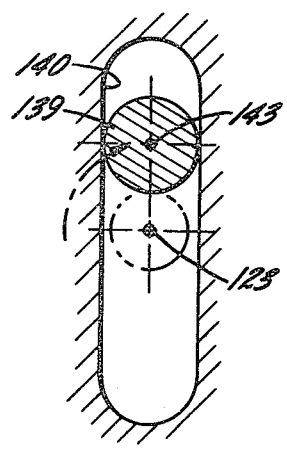
Figure 15C:
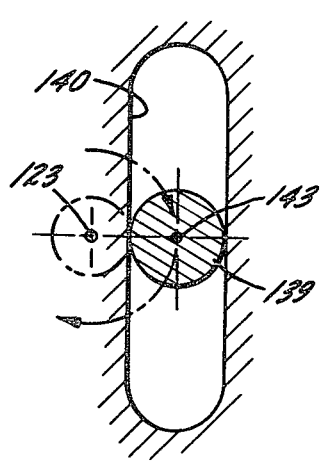

The manner in which that occurs will be more readily appreciated with reference to the schematic diagrams of FIGS. 15a-15c. There is illustrated the fixed axis of rotation 123 of the driving shaft 122 and the additional axis 143 of the cam follower 139. FIG. 15a illustrates the normal operating position of the apparatus in which the tension sleeve is in its forward position. When it is desired to create slack, the shaft 122 is rotated through 360°. Since the axis 143 is at a known distance from the axis 123 as established by the setting of the adjusting knob 135, the rotation of the stroke adjusting block 130 about axis 123 causes the axis 143 to move in a circle about the axis 123. By means of the guide rods 108, 109 constraining the sliding block to only axial motion, any radial component of motion will be taken up by movement of the cam follower 139 within the slot, while the axial component of motion will be taken up by movement of the cam follower 139 within the slot, while the axial component of motion will be fully utilized by drawing the block to the rear, then returning it to the fore.

FIG. 15b shows the relative position of the elements after 90° of rotation; the cam follower 139 is moved laterally within the slot 140, but also translates the entire sliding block to the rear. FIG. 15c illustrates the elements after 180° of rotation, showing the slot and the block which carries it have been translated to the rearmost position. Rotation continues with the cam follower then moving down in the slot as the slotted block is carried forward until the apparatus returns to the FIG. 15a position. Since the sleeve engaging bracket 73 is attached to the slotted sliding block 106, the tension sleeve 71 is carried first aft, then returned forward, as previously described schematically in connection with FIGS. 9-11.

It will now be apparent that each linear stroke of the pneumatic actuator 115 will cause a full cycle, although the direction of rotation will reverse for advance and retard actuations of the cylinder. Using only a single stroke of the cylinder, it has been found that slack can be created within the limited operating time available, without the need for delaying the clipping cycle of the chub stuffer by more than the 0.1 seconds previously mentioned.

As a means of adjusting the amount of slack which is to be created, operation of the stroke adjustment knob 135 serves to adjust the length of the stroke of the slacker, by displacing the axis 143 from the axis 123 to either increase the stroke as the distance is increased or decrease the stroke as the distance is decreased. This provides a precise control over the stroke length of the slacker which translates into precise control over the length of slack casing which is created, thereby rendering the system adaptable to a wide range of stuffing requirements.

It is seen that the sleeve engaging bracket 73 by means of the actuating arm 105 is pivotably mounted on the sliding block 106 so as to be rotatable about a shaft 107. As a result, the bracket can be pivoted out of the way during the indexing of the turret assembly when it is desired to replace an expended casing stick. A ball plunger 180 on the actuator arm 105 and a ball button 181 in the sliding block cooperate to position the sleeve engaging bracket 73 in the proper position to receive the flange 72 of a new casing stick as it is indexed into position.

It was previously noted that stuffing pressure adjustment was available by altering the distance between the emulsion seal 63 and the sizing ring 60 which is mounted on the tension sleeve. For this embodiment, a holdback force adjustment assembly 160 is provided as shown in FIGS. 12 and 13. The adjustment includes an operating knob 161 mounted on a threaded rod 162 which is secured by means of a pair of collars 163, 164 in a stationary base plate 165. The stationary base plate includes a pair of guide rods 166, 167 upon which is mounted the movable base plate 116. The threaded rod 162 is fixed to the movable base plate 116 as by welding. Accordingly, rotation of the knob 161 causes the threaded rod 162 to move in or out with respect to the stationary base plate 165, carrying the movable base plate 118 along with it. Since the sleeve engaging bracket 73 is secured by the mechanism previously described to the movable base plate, the tension sleeve is carried either toward or away from the emulsion seal 63, thereby adjusting the position of the sizing ring 60 with respect to the emulsion seal 63.

In the chub stuffer as commercially supplied, attachment between the turret mechanism 20 (FIG. 8) and the remainder of the chub stuffer including the clipping and gathering mechanism 40 is accomplished by means of a connecting rod to which the respective elements are clamped. In making the present system adaptable for simple modification of such a machine, the connecting rod is replaced by the slacker mechanism 100 which in addition to providing slack as just described serves as means for attaching the turret assembly to the stuffing machine. To that end, the slacker mechanism carries a mounting stub 170 which is secured in a clamp 171 by operation of a clamp tightening arm 172, thereby to attach the left end of the slacker mechanism to the stuffing machine. Similarly, the opposite end of the slacker assembly carries another mounting stub 175 which is secured in a second clamp 176 to the turret head assembly of the machine. As a result, it is a relatively simple operation to install the slacking mechanism when it is desired to stuff controllably premoisturized casing.

Due in part to the ease of mounting which is provided, a slacking mechanism can be supplied in kit form for installation in the field. In addition it is a simple matter to use a modified machine with both fully soaked and controllably moisturized casing as desired. System configurations for use of premoisturized casing have been described above. If it is desired to switch to fully soaked casing, it is only necessary to (1) deactivate the slacker by a simple on/off switch and swing the holder 73 to an inoperative position, and (2) reinstall the conventional external holdback device. Since the emulsion seal 63 rides in the carrier 65 which normally holds the external holdback device, the latter is slipped over the casing stick and indexed into operative position by the turret as in conventional use of the machine.

Preferred embodiments of the present invention have been described and are suitable for use with many types of shirred casing which can be mounted on a tension sleeve. With respect to the casing aspect, additional benefit can be gained by utilizing the invention described and claimed in previously filed Beckman et al. application Ser. No. 273,180 assigned to the same assignee as this application. That application describes and claims a casing article in which the shirred casing is compressed in place on the tension sleeve and the sizing ring is then fixed in position on the end of the sleeve. The casing end is then clipped closed so as to be immediately ready for stuffing when the sleeve is slid on the horn and indexed into position. Utilizing the compressed in place casing provides additional advantages including increasing the amount of casing supply which can be shirred into a stick having a length compatible with the stuffing horn.

It will now be appreciated that the illustrated embodiments of this invention provide a novel and efficient method for using premoisturized casing in the FCA-S type of stuffing machine. In these embodiments a sizing ring is used to control the stuffed product circumference, while at the same time efficient means is provided for creating casing slack and relieving the holdback force achieved by the sealing ring/sizing ring relationship, thereby to supply whatever additional casing is required to accommodate the gathering and clipping operation. By relieving the holdback force for gathering and clipping in the manner of the first embodiment of this invention, no increase in the cycle time of the machine is required. While a second embodiment provides even greater stuffing machine versatility with a minimal cycle time increase. Thus, product of size and quality comparable to that produced by the FCA-S machine in its normal operating mode, using substantially fully soaked casing, is achieved by this invention.

While the specific disclosure presented herein illustrates how the invention is utilized with the FCA-S stuffing machine, the principles involved are suitable for adaptation to other stuffing machines. It is to be understood that modifications and changes to elements of the invention can be made by persons skilled in the art to adapt the invention for use on the FCA-S or other specific stuffing machines without departing from the spirit and scope of the invention. For example, as shown in the present disclosure, the internal sizing means 60 is mounted on the tension sleeve 71. It is readily apparent, however, that in some embodiments the internal sizing means may be mounted directly on the stuffing horn 21. Additionally, as disclosed herein, the sizing means or sizing ring 60 has an annular disc-like configuration, but the sizing means may have any configuration. Thus the term "sizing means" is intended to include any means internally confined within the casing which is capable of circumferentially stretching the casing, including expandable devices such as that disclosed in U.S. Pat. No. 4,202,075 to Michel et al.

EXAMPLE I

In order to test the method of the present invention, two standard size controllably moisturized casings (size 47 and size 60) were stuffed with sausage emulsion to provide stuffed sausages ranging in length from 140 mm. to about 330 mm. The FCA-S stuffing apparatus used in the tests was modified by replacing the translatable snubbing ring thereof with a translatable sealing ring.

The modified apparatus was tested with and without the sequential addition of the sizing ring and rear slacker devices as depicted in FIGS. 1 to 15c of the present specification.

In a second series of tests, dry sausage mix was stuffed in accordance with the procedure set forth above for the sausage emulsion.

The results of the tests showed that the use of controllably premoisturized casings in the method of the present invention provided acceptably stuffed encased sausages for lengths down to about 150 mm. on the modified FCA-S machine when using the sizing ring in conjunction with the translatable sealing ring. Use of the rear slacker provided further improvement in stuffing premoisturized casings in some instances.

What is claimed is:

1. In a method of stuffing flowable product using a stuffing machine of the type compatible with a range of stuffing pressures associated with fully soaked casing, and of the type having a double clipper which constricts the stuffed product by means of a pair of gates, separates the gates, then applies a pair of clips, said method comprising the steps of stretching the casing with an internal sizing means to establish a holdback force and to stretch the casing to about its recommended stuffed circumference to thereby cause the casing to take a temporary set, interposing a sealing ring near the end of the stuffing horn and over the casing to prevent backup of flowable product, establishing a distance between the sealing ring and the sizing means to establish a casing angle therebetween which increases the holdback force to cause the stuffing of the casing to a desired circumference, the improvement comprising adapting said stuffing machine to stuff controllably premoisturized casing by translating the sealing ring away from the sizing ring after stuffing and during or before gathering to reduce the casing holdback force as evidenced by reduced casing angle, thereby to prevent pressure buildup beyond acceptable limits in the stuffed product during said constricting and separating.

2. The improved method of claim 1 which comprises the additional step of providing supplemental slack to the casing prior to completing the constricting phase of the clipper operation using a slacking means coacting with said sizing ring and said sealing ring to provide said supplement slack.

3. The improved method of claim 2 wherein said slacking means is a fast-acting slacking means having a slacking cycle of no greater than about 0.16 seconds.

4. A method of stuffing flowable product into casing using a stuffing machine containing a sizing means and a translatable sealing ring together with means to gather and close the encased stuffed product, said method comprising the steps of stretching the casing with an internal sizing means to establish a holdback force and to stretch the casing to about its recommended stuffed circumference to thereby cause the casing to take a temporary set, interposing the sealing ring near the end of the stuffing horn and over the casing to prevent backup of flowable product, establishing a distance between the sealing ring and the sizing means to establish a casing angle therebetween which increases the holdback force to cause the stuffing of the casing to a desired circumference, said method further comprising the additional step of translating the sealing ring away from the sizing ring after stuffing and during or before gathering to reduce the casing holdback force as evidenced by reduced casing angle, thereby to prevent pressure buildup beyond acceptable limits in the stuffed product.

5. The improved method of claim 4 which comprises the additional step of providing supplemental slack to the casing prior to completing the constricting phase of the clipper operation using a slacking means coacting with said sizing ring and said sealing ring to provide said supplemental slack.

6. The improved method of claim 5 wherein said slacking means is a fast-acting slacking means having a slacking cycle of no greater than about 0.16 seconds.

* * * * *